US009614611B2

(12) United States Patent
Liu

(10) Patent No.: US 9,614,611 B2
(45) Date of Patent: Apr. 4, 2017

(54) METHOD AND APPARATUS FOR INCREASING CAPACITY OF AIR INTERFACE

(75) Inventor: Haiwei Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 67 days.

(21) Appl. No.: 14/404,079

(22) PCT Filed: Jul. 16, 2012

(86) PCT No.: PCT/CN2012/078682
§ 371 (c)(1),
(2), (4) Date: Nov. 26, 2014

(87) PCT Pub. No.: WO2013/177853
PCT Pub. Date: Dec. 5, 2013

(65) Prior Publication Data
US 2015/0162978 A1 Jun. 11, 2015

(30) Foreign Application Priority Data

May 30, 2012 (CN) .......................... 2012 1 0173633

(51) Int. Cl.
H04W 72/00 (2009.01)
H04B 7/26 (2006.01)
(Continued)

(52) U.S. Cl.
CPC ........... *H04B 7/264* (2013.01); *H04L 1/0002* (2013.01); *H04W 52/52* (2013.01);
(Continued)

(58) Field of Classification Search
CPC ........ H04B 7/264; H04L 1/002; H04W 52/52; H04W 72/0446; H04W 88/08; H04W 76/045; H04W 76/048
(Continued)

(56) References Cited

U.S. PATENT DOCUMENTS 5,761,634 A * 6/1998 Stewart ................... G10L 19/16
704/211
6,330,462 B1 * 12/2001 Chen ................... H04W 52/267
455/39
(Continued)

FOREIGN PATENT DOCUMENTS

CN 101359978 A 2/2009
CN 101409950 A 4/2009
(Continued)

OTHER PUBLICATIONS

International Search Report for corresponding application PCT/CN2012/078682 filed Jul. 17, 2012; Mail date Mar. 7, 2013.
(Continued)

*Primary Examiner* — Marceau Milord
(74) *Attorney, Agent, or Firm* — Cantor Colburn LLP

(57) ABSTRACT

The disclosure provides a method and an apparatus for increasing the capacity of an air interface. The method comprises the following steps that: after a traffic channel is established on a base station side, a base station transmitting a ⅛ rate frame to the air interface in a continuous transmission mode if not capturing a traffic channel frame prefix from a terminal, so as to ensure that the terminal can receive a forward frame of the base station; the base station only reducing the transmission of the ⅛ rate frame after capturing the prefix from the terminal; and the terminal keeping calling and does not release the call if continuous good frames are received during the demodulation of forward traffic frame from the base station. Through the disclosure, the interference between forward channels is reduced, and the capacity of the air interface is increased.

10 Claims, 3 Drawing Sheets

(51) Int. Cl.
    *H04L 1/00*     (2006.01)
    *H04W 52/52*     (2009.01)
    *H04W 72/04*     (2009.01)
    *H04W 76/04*     (2009.01)
    *H04W 88/08*     (2009.01)

(52) U.S. Cl.
    CPC ..... *H04W 72/0446* (2013.01); *H04W 76/045* (2013.01); *H04W 76/048* (2013.01); *H04W 88/08* (2013.01)

(58) Field of Classification Search
    USPC .................. 455/452.1, 63.1, 67.13, 450, 509
    See application file for complete search history.

(56) References Cited

U.S. PATENT DOCUMENTS

| | | | | |
|---|---|---|---|---|
| 6,535,723 | B1* | 3/2003 | Jiang | H04W 52/241 455/24 |
| 6,574,593 | B1* | 6/2003 | Gao | G10L 19/00 704/222 |
| 6,587,447 | B1* | 7/2003 | Wang | H04W 52/12 370/332 |
| 6,590,874 | B1* | 7/2003 | Wang | H04B 7/2637 370/252 |
| 6,603,745 | B1* | 8/2003 | Antonio | H04W 28/26 370/318 |
| 7,058,035 | B2* | 6/2006 | English | H04W 36/18 370/332 |
| 7,099,629 | B1* | 8/2006 | Bender | H04L 5/0053 370/335 |
| 7,194,281 | B2* | 3/2007 | Peng | H04W 36/18 370/318 |
| 7,519,011 | B2* | 4/2009 | Petrus | H04B 7/2656 370/280 |
| 7,561,896 | B2* | 7/2009 | Csapo | H04W 4/10 370/312 |
| 7,570,621 | B2* | 8/2009 | Garg | H04L 1/0002 370/335 |
| 7,933,235 | B2* | 4/2011 | Lott | H04W 52/34 370/252 |
| 7,996,234 | B2* | 8/2011 | Dieterich | G10L 19/24 375/240.23 |
| 8,140,101 | B1* | 3/2012 | Wurtenberger | H04W 52/346 370/318 |
| 8,145,228 | B2* | 3/2012 | Casaccia | H04W 74/008 455/409 |
| 8,184,596 | B2* | 5/2012 | Karlsson | H04W 16/14 370/335 |
| 8,260,609 | B2* | 9/2012 | Rajendran | G10L 21/038 704/208 |
| 8,275,406 | B2* | 9/2012 | Chen | H04L 1/0002 370/328 |
| 8,432,824 | B2* | 4/2013 | Yu | H04L 25/03012 370/252 |
| 8,599,945 | B2* | 12/2013 | Sampath | H04B 7/0417 375/260 |
| 8,817,651 | B2* | 8/2014 | Yu | H04L 5/0048 370/252 |
| 8,867,382 | B2* | 10/2014 | Yu | H04W 52/241 370/203 |
| 8,902,862 | B2* | 12/2014 | Yu | H04B 17/0057 370/336 |
| 2005/0124348 | A1* | 6/2005 | Gaal | H04J 13/0048 455/450 |

FOREIGN PATENT DOCUMENTS

| | | |
|---|---|---|
| WO | 9943105 A1 | 8/1999 |
| WO | 2005101696 A2 | 10/2005 |

OTHER PUBLICATIONS

European Search Report for corresponding application EP 12 87 8102; Report dated Jan. 21, 2016.

* cited by examiner

METHOD AND APPARATUS FOR INCREASING CAPACITY OF AIR INTERFACE

TECHNICAL FIELD

The disclosure relates to air interface link transmission technology between a base station and a terminal, including, e.g., a method and an apparatus for increasing the capacity of an air interface.

BACKGROUND

In a Code Division Multiplex Access (CDMA) communication system, an air interface refers to a transmission link between a base station and a terminal; and the size of capacity of the air interface mainly depends on forward/backward link interference, Channel Element (CE) resources, power resources and other factors. In the air interface link data transmission, a forward traffic frame transmitted by the base station comprises a full rate frame, a ½ rate frame, a ¼ rate frame and a ⅛ rate frame. The ⅛ rate frame is used for carrying background noise and may not transmit actual speech contents, while other rate frames all carry speech contents. The ⅛ rate frame occupies a very large proportion and is often over 60% in a communication process, so that the transmission of many ⅛ rate frames may increase forward interference and cause the waste of air interface resources.

SUMMARY

A method and an apparatus for increasing the capacity of an air interface are provided in the embodiment of the disclosure, in order to solve the problems of insufficient air interface capacity and serious interference in the related art.

According to the first aspect of the embodiment of the disclosure, a method for increasing the capacity of an air interface is provided, comprising:

after a traffic channel is established on a base station side, transmitting, by the base station, a ⅛ rate frame to the air interface in a continuous transmission mode if the base station does not capture a traffic channel frame prefix from a terminal, so as to ensure that the terminal is able to receive a forward frame of the base station; reducing, by the base station, only the transmission of the ⅛ rate frame after the base station captures the prefix from the terminal; and keeping calling, by the terminal, instead of releasing the call if continuous good frames are received during demodulation of forward traffic frame from the base station.

According to an embodiment of the disclosure, the base station reduces the transmission of the ⅛ rate frame by converting the continuous transmission mode into a periodic transmission mode.

According to an embodiment of the disclosure, a non-frame detection period of the terminal should be more than a transmission period of the ⅛ rate frame, so as to ensure the detection of continuous good frames of the ⅛ rate frame.

According to an embodiment of the disclosure, reducing, by the base station, only the transmission of the ⅛ rate frame after the base station captures the prefix from the terminal comprises that: judging, by the base station, whether the forward traffic frame currently transmitted is the ⅛ rate frame after the base station captures the prefix from the terminal; if so, judging whether a count value of a frame transmission counter is more than a threshold of starting transmitting continuous ⅛ rate frames, if so, transmitting ⅛ rate frames continuously, and otherwise, reducing the transmission of the ⅛ rate frame; and if the forward traffic frame currently transmitted by the base station is not the ⅛ rate frame, transmitting the forward traffic frame in a conventional mode.

According to an embodiment of the disclosure, the step of reducing the transmission of the ⅛ rate frame comprises: stopping the transmission of the ⅛ rate frame by setting a data gain to 0; and transmitting a backward power control bit by setting a power control gain to a normal value.

According to an embodiment of the disclosure, the step of transmitting continuous ⅛ rate frames comprises: transmitting N ⅛ rate frames continuously, where N=transmission period-threshold value; and if other non-⅛ rate frames are received during the continuous transmission of N ⅛ rate frames, transmitting other non-⅛ rate frames.

According to the second aspect of the embodiment of the disclosure, an apparatus for increasing the capacity of an air interface is provided, comprising: a traffic channel frame prefix capturing component, configured to capture a traffic channel frame prefix from a terminal after a traffic channel is established on a base station side, so as to obtain the result of capturing the traffic channel frame prefix or the result of not capturing the traffic channel frame prefix; a ⅛ rate frame transmitting component, configured to continuously transmit ⅛ rate frames according to the result of not capturing the traffic channel frame prefix and reduce the transmission of the ⅛ rate frame according to the result of capturing the traffic channel frame prefix; and a traffic frame detecting component, configured to facilitate the terminal to keep calling instead of releasing the call if continuous good frames are detected during demodulation of a forward traffic frame from the base station.

According to an embodiment of the disclosure, the ⅛ rate frame transmitting component comprises: a continuous transmission mode element, configured to set a continuous transmission mode; a periodic transmission mode element, configured to set a periodic transmission mode; and a ⅛ rate frame transmission element, configured to transmit continuous ⅛ rate frames according to the set continuous transmission mode or reduce the transmission of the ⅛ rate frame according to the set periodic transmission mode.

According to an embodiment of the disclosure, the apparatus in the embodiment further comprises a non-frame detection period component, a detection period of which is more than a transmission period of the ⅛ rate frame, so as to ensure the detection of continuous good frames of the ⅛ rate frame.

According to an embodiment of the disclosure, the apparatus in the embodiment further comprises a frame transmission counter, configured to judge whether its count value is more than the threshold of starting transmitting continuous ⅛ rate frames after the base station receives the traffic channel frame prefix from the terminal and determines that the traffic frame currently transmitted is the ⅛ rate frame; if so, the ⅛ rate frame transmitting component is notified to transmit the ⅛ rate frames continuously; otherwise, the ⅛ rate frame transmitting component is notified to reduce the transmission of the ⅛ rate frame.

Compared with the related art, the embodiments of the invention bring the following technical effects: 1) the transmission amount of ⅛ rate frame of the air interface is reduced greatly, the interference between forward channels is reduced and the capacity of the air interface is increased;

and 2) the disclosure is favourable for the increase of call success rate and the reduction of call drop.

DETAILED DESCRIPTION OF THE EMBODIMENTS

The disclosure will be described below in combination with the drawings and the embodiments in detail. It should be noted that, the embodiments of the application and features therein can be combined with each other if there is no conflict.

Figure 1:
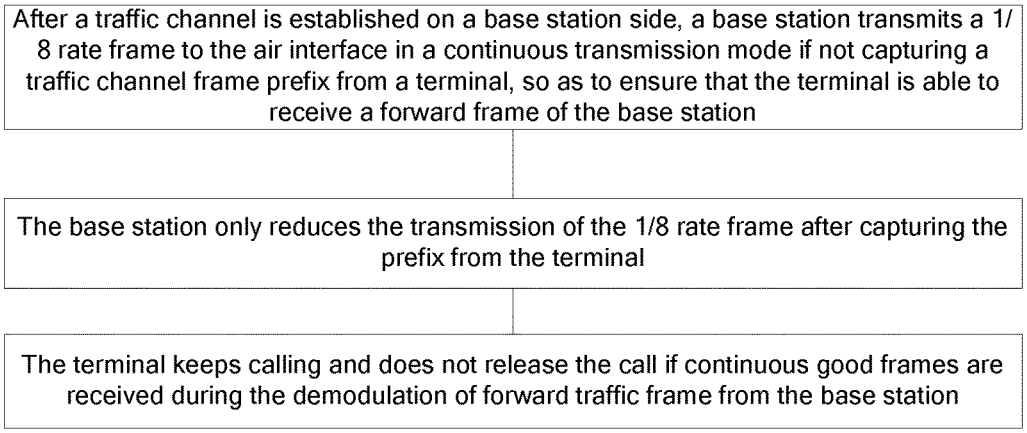
FIG. 1 is a flowchart of a method for increasing the capacity of an air interface according to an embodiment of the disclosure.

FIG. 1 is a flowchart of a method for increasing the capacity of an air interface according to an embodiment of the disclosure. As shown in FIG. 1, the flow comprises the following steps that:

A) After a call is started and a traffic channel is established on a base station side, a base station, if not capturing a traffic channel frame prefix from a terminal, transmits a ⅛ rate frame to the air interface in a continuous transmission mode, so as to ensure that the terminal is able to receive a forward frame from the base station.

B) After capturing the prefix from the terminal, the base station only reduces the transmission of the ⅛ rate frame.

C) If continuous good frames are received during the demodulation of forward traffic frame from the base station, the terminal keeps calling instead of releasing the call till the call is ended.

The base station has two transmission modes for the ⅛ rate frame: continuous transmission mode and periodic transmission mode; and the transmission of the ⅛ rate frame can be reduced by converting the continuous transmission mode into the periodic transmission mode.

Furthermore, in the embodiment, the non-frame detection period performed by the terminal should be more than the transmission period of the ⅛ rate frame, so as to ensure the detection of continuous good frames of the ⅛ rate frame.

According to an embodiment of the disclosure, Step B) comprises that: after the base station captures the traffic channel frame prefix from the terminal, whether the forward traffic frame currently transmitted by the base station is the ⅛ rate frame is judged.

If the forward traffic frame currently transmitted by the base station is the ⅛ rate frame, whether the count value of a frame transmission counter is more than the threshold of starting transmitting continuous ⅛ rate frames is judged; if so, the ⅛ rate frames are continuously transmitted; and otherwise, the transmission of the ⅛ rate frame is reduced.

If the forward traffic frame currently transmitted by the base station is not the ⅛ rate frame, the forward traffic frame is transmitted in a conventional mode.

In the embodiment, the transmission of the ⅛ rate frame is reduced by the following steps that: the transmission of the ⅛ rate frame is stopped by setting a data gain to 0; and a backward power control bit is transmitted by setting a power control gain to a normal value.

In addition, in the embodiment, continuous ⅛ rate frames are transmitted by the following steps that: N ⅛ rate frames are continuously transmitted, where N=transmission period-threshold value; and if other non-⅛ rate frames are received during the continuous transmission of N ⅛ rate frames, other non-⅛ rate frames are transmitted.

Figure 2:
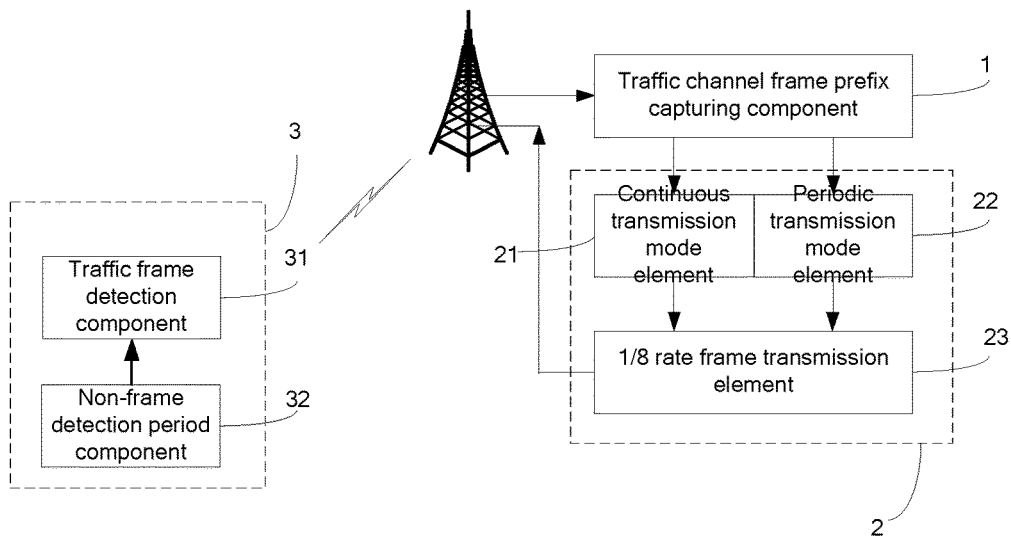
FIG. 2 is a diagram of an apparatus for increasing the capacity of an air interface according to an embodiment of the disclosure.

FIG. 2 is a diagram of an apparatus for increasing the capacity of an air interface according to an embodiment of the disclosure. As shown in FIG. 2, the apparatus comprises:

a traffic channel frame prefix capturing component 1, set on a base station side, is configured to capture a traffic channel frame prefix from a terminal after a call is started and a traffic channel is established on the base station side, so as to obtain the result of capturing the traffic channel frame prefix and the result of not capturing the traffic channel frame prefix;

a ⅛ rate frame transmitting component 2, set on the base station side, is configured to continuously transmit ⅛ rate frames according to the result of not capturing the traffic channel frame prefix and reduce the transmission of the ⅛ rate frame according to the result of capturing the traffic channel frame prefix; and a traffic frame detection component 31, set on a terminal side 3, is configured to facilitate the terminal to keep calling instead of releasing the call till the call is ended if continuous good frames are detected during the demodulation of the forward traffic frame from the base station.

Preferably, the ⅛ rate frame transmitting component 2 comprises: a continuous transmission mode element 21, is configured to set a continuous transmission mode; a periodic transmission mode element 22, is configured to set a periodic transmission mode; and a ⅛ rate frame transmission element 23, is configured to transmit continuous ⅛ rate frames according to the set continuous transmission mode or reduce the transmission of the ⅛ rate frame according to the set periodic transmission mode.

Specifically, after a call is started and a traffic channel is established on a base station side, the traffic channel frame prefix capturing component 1 notifies the continuous transmission mode element 21 to set the transmission mode of the ⅛ rate frame transmission element 23 to a continuous transmission mode if the traffic channel frame prefix is not captured from the terminal, so that ⅛ rate frames are transmitted continuously; and if the traffic channel frame prefix is captured, the traffic channel frame prefix capturing component 1 notifies the periodic transmission mode element 22 to set the transmission mode of the ⅛ rate frame transmission element 23 to a periodic transmission mode, so that the ⅛ rate frame is transmitted periodically.

In addition, the terminal is further provided with a non-frame detection period component, the detection period of which is more than the transmission period of the ⅛ rate frame, so as to ensure the detection of continuous good frames of the ⅛ rate frame.

In addition, the base station side is further provided with a frame transmission counter (not shown), is configured to judge whether its count value is more than the threshold of starting transmitting continuous ⅛ rate frames after the base station receives the traffic channel frame prefix from the terminal and determines that the traffic frame currently transmitted is the ⅛ rate frame; if so, the ⅛ rate frame transmitting component 2 is notified to transmit ⅛ rate frames continuously; and otherwise, the ⅛ rate frame transmitting component 2 is notified to reduce the transmission of the ⅛ rate frame.

The main characteristics of the embodiment and the preferred implementation are as follows: when the base station does not capture prefix from the terminal, ⅛ rate frames are transmitted continuously; and when the base station captures a prefix from the terminal, the ⅛ rate frame is transmitted periodically, thereby reducing the transmission of an air interface message and the interference between forward channels and achieving the aim of increasing the capacity of the air interface.

Figure 3:
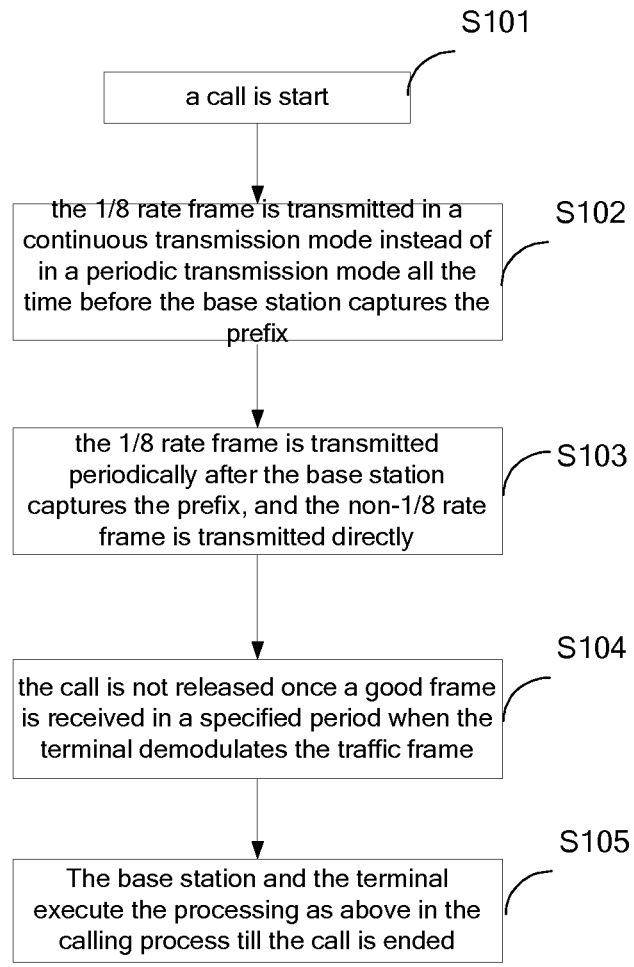
FIG. 3 is a flowchart of a method in a preferred embodiment of the disclosure.

FIG. 3 is a flowchart of a method in a preferred embodiment of the disclosure. As shown, the flow comprises the following steps that:

Step 101: A call is started.

Step 102: After a traffic channel is completely established on a base station side, a base station forwardly transmits ⅛ rate frames in a continuous transmission mode and cannot reduce the transmission if capturing no traffic channel frame prefix from a terminal, so as to ensure that the terminal can receive the forward frame of the base station.

Step 103: After capturing a prefix from the terminal, the base station reduces the transmission of the ⅛ rate frame and transmits the ⅛ rate frame periodically; and a non-⅛ rate frame needs to be transmitted directly and cannot be reduced in transmission.

Step 104: If continuous good frames are received when the terminal demodulates the forward traffic frame, the terminal does not release the call and keeps calling.

Step 105: During the call, the base station and the terminal execute the processing in Steps 103 and 104 all the time till the call is ended.

Preferably, in Step 102, the transmission of ⅛ rate frame cannot be reduced in the initial stage of the call. This is because the terminal needs to capture the forward traffic channel prefix of the base station in the initial stage, and once the transmission is reduced, the terminal cannot receive the forward traffic prefix, which may result in call failure.

Preferably, in Step 103, after the capturing, only the transmission of the ⅛ rate frame can be reduced and the transmission of non-⅛ rate frame cannot be reduced. This is because the ⅛ rate frame transmits background noise, while the non-⅛ rate frame transmits speech contents.

Preferably, in Step 104, during the transmission reduction of the ⅛ rate frame, the terminal demodulates a deletion frame; and in order to prevent the call from being released, it is necessary to ensure that the terminal does not release the call once receiving a good frame. The non-frame detection period of the terminal should be more than the transmission period of the ⅛ rate frame.

Figure 4:
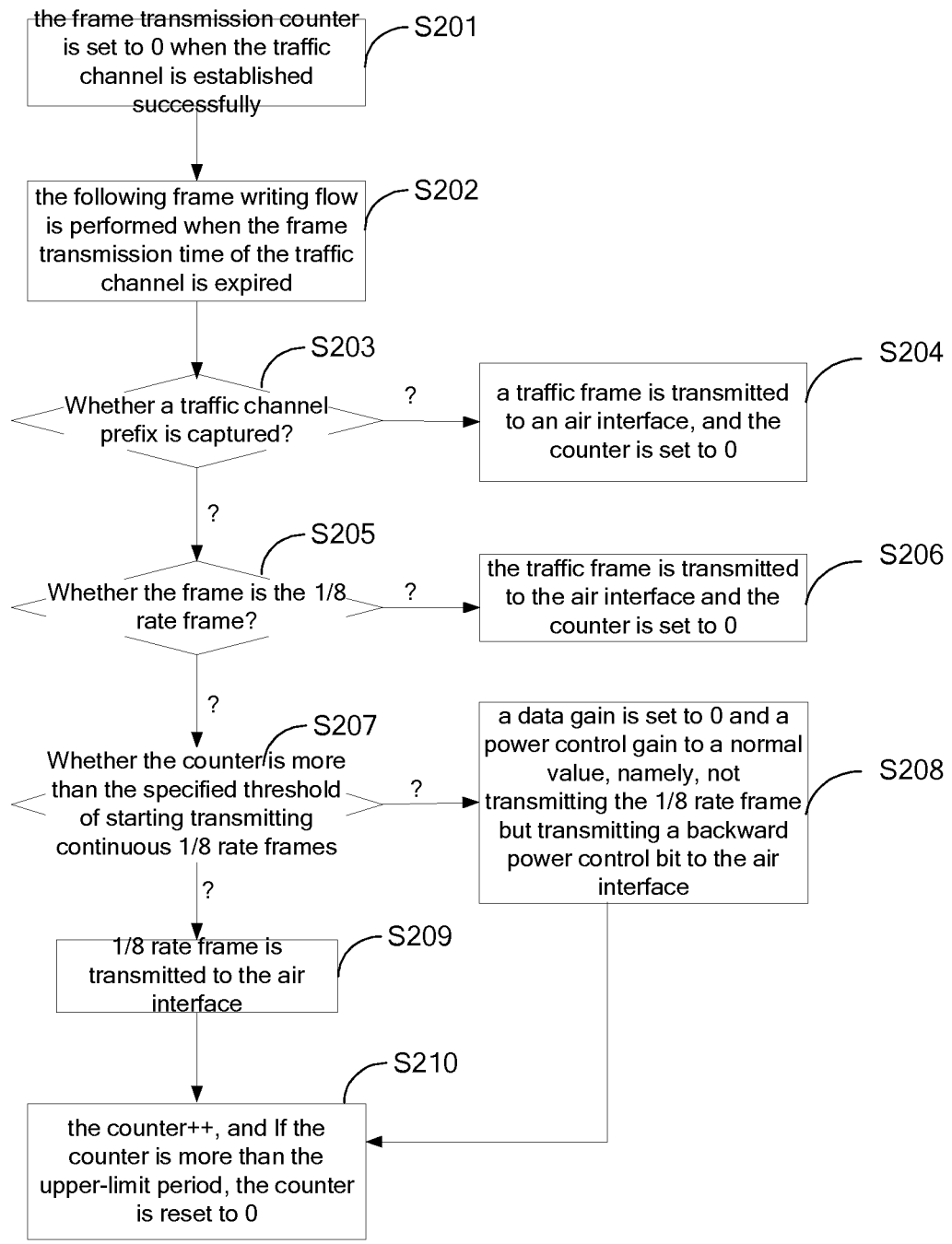
FIG. 4 is a flowchart for showing the specific implementation flow of a method in a preferred embodiment of the disclosure.

FIG. 4 is a flowchart for showing the specific implementation flow of a method in a preferred embodiment of the disclosure. As shown, the flow comprises the following steps that:

Step 201: After a call is started and a traffic channel is established successfully, the value of a frame transmission counter is set to 0.

Step 202: Whether the time for writing a traffic channel frame is expired is judged, if so, the following flow is executed.

Step 203: Whether a backward traffic channel prefix has been captured is judged, if not, Step 204 is executed, and otherwise, Step 205 is executed.

Step 204: No backward prefix be captured during to the terminal does not receive the forward traffic frame of the base station, so that it is necessary to transmit ⅛ rate frames continuously to increase the probability of capturing the base station by the terminal, such as a mobile phone, and accordingly, the terminal transmits a backward traffic frame prefix to increase the probability of capturing the terminal by the base station. Meanwhile, the value of the counter is set to 0.

Step 205: This step indicates that the base station has captured the backward traffic channel prefix, and it is necessary to judge whether the forward traffic frame currently transmitted is the ⅛ rate frame, if not, Step 206 is executed; and otherwise, Step 207 is executed.

Step 206: If the non-⅛ rate frame is a speech frame, it is necessary to transmit the traffic frame to the terminal and set the value of the counter to 0.

Step 207: Whether the value of the counter is more than the threshold value of starting transmitting ⅛ rate frames continuously is judged; if not, Step 208 is executed; and otherwise, Step 209 is executed.

Step 208: When a frame is written, a data gain is set to 0 and no frame is transmitted to the air interface.

Step 209: The base station needs to transmit ⅛ rate frames continuously to maintain a link from the base station to the terminal.

Step 210: If the period of the counter is more than the transmission period, the value of the counter is set to 0.

It should be noted that the call can be kept all the time in Step 202 and such operation may be executed at a specific frame writing time. For example, the frame writing is executed every 20 millisecond.

In Step 204, before the backward traffic channel of the base station does not capture the prefix from the terminal, the transmission of the ⅛ rate frame cannot be reduced. This is because the probability of the terminal receiving the forward traffic frame may be reduced once the transmission is reduced, which may cause a call failure or an overlong call connection time and the like.

In Step 206, the non-⅛ rate frame bears speech information, so that such problems as speech interruption may be caused if the transmission of the non-⅛ rate frame is reduced. Consequently, the transmission of the non-⅛ rate frame cannot be reduced.

In Step 208, it is necessary to set the value of data gain to 0 when the transmission of ⅛ rate frame needs to be reduced; namely, the ⅛ rate frame is not transmitted but the power control gain still needs to be set to a normal value to perform backward power control on the terminal.

In Step 209, when ⅛ rate frames need to be transmitted continuously, N ⅛ rate frames needs to be transmitted continuously in total (N=period-threshold value). If other non-⅛ rate frames are received in this period, the non-⅛ rate frames are transmitted; and after the transmission is completed, the transmission of ⅛ rate frame in the next period is started again.

Of course, other various implementation ways may also be adopted in the embodiments, for example, the terminal reduces the transmission of the ⅛ rate frame and the base station side performs the corresponding non-frame detection.

To sum up, by the embodiments and the preferred implementation ways, the transmission amount of ⅛ rate frame of the air interface is greatly reduced, the interference between forward channels is reduced, and the capacity of the air interface is increased. Moreover, the embodiment of the disclosure is favourable for the increase of call success rate and the reduction of call drop.

Although being described in detail in the text above, the disclosure is not limited here; and those skilled in the art shall make various modifications according to the principle of the disclosure. Therefore, any modifications made according to the principle of the disclosure shall fall within the scope of protection of the disclosure.

What is claimed is:

1. A method for increasing the capacity of an air interface, comprising:
   after a call is started and a traffic channel is established on a base station side, transmitting, by a base station, a ⅛ rate frame to the air interface in a continuous transmission mode if the base station does not capture a traffic channel frame prefix from a terminal, so as to ensure that the terminal is able to receive a forward frame of the base station;
   reducing, by the base station, only the transmission of the ⅛ rate frame after the base station captures the prefix from the terminal; and
   keeping calling, by the terminal, instead of releasing the call if continuous good frames are received during demodulation of forward traffic frame from the base station.

2. The method according to claim 1, wherein the base station reduces the transmission of the ⅛ rate frame by converting the continuous transmission mode into a periodic transmission mode.

3. The method according to claim 2, wherein a non-frame detection period of the terminal is more than a transmission period of the ⅛ rate frame so as to ensure the detection of continuous good frames of the ⅛ rate frame.

4. The method according to claim 1, wherein reducing, by the base station, only the transmission of the ⅛ rate frame after the base station captures the prefix from the terminal comprises:
   judging, by the base station, whether the forward traffic frame currently transmitted is the ⅛ rate frame after the base station captures the prefix from the terminal;
   if so, judging whether a count value of a frame transmission counter is more than a threshold of starting transmitting continuous ⅛ rate frames, if so, transmitting ⅛ rate frames continuously, and otherwise, reducing the transmission of the ⅛ rate frame; and
   if the forward traffic frame currently transmitted by the base station is not the ⅛ rate frame, transmitting the forward traffic frame in a conventional mode.

5. The method according to claim 4, wherein reducing the transmission of the ⅛ rate frame comprises:
   stopping the transmission of ⅛ rate frame by setting a data gain to 0; and
   transmitting a backward power control bit by setting a power control gain to a normal value.

6. The method according to claim 4, wherein transmitting continuous ⅛ rate frames comprises:
   transmitting N ⅛ rate frames continuously, where N=transmission period-threshold value; and
   if other non-⅛ rate frames are received during the continuous transmission of N ⅛ rate frames, transmitting other non-⅛ rate frames.

7. An apparatus for increasing the capacity of an air interface, comprising:
   a traffic channel frame prefix capturing component, configured to capture a traffic channel frame prefix from a terminal after a call is started and a traffic channel is established on a base station side, so as to obtain the result of capturing the traffic channel frame prefix or the result of not capturing the traffic channel frame prefix;
   a ⅛ rate frame transmitting component, configured to continuously transmit ⅛ rate frames according to the result of not capturing the traffic channel frame prefix and reduce the transmission of the ⅛ rate frame according to the result of capturing the traffic channel frame prefix; and
   a traffic frame detecting component, configured to facilitate the terminal to keep calling instead of releasing the call if continuous good frames are detected during demodulation of a forward traffic frame from the base station.

8. The apparatus according to claim 7, wherein the ⅛ rate frame transmitting component comprises:
   a continuous transmission mode element, configured to set a continuous transmission mode;
   a periodic transmission mode element, configured to set a periodic transmission mode; and
   a ⅛ rate frame transmission element, configured to transmit continuous ⅛ rate frames according to the set continuous transmission mode or reduce the transmission of the ⅛ rate frame according to the set periodic transmission mode.

9. The apparatus according to claim 8, further comprising a non-frame detection period component, a detection period of which is more than a transmission period of the ⅛ rate frame, so as to ensure the detection of continuous good frames of the ⅛ rate frame.

10. The apparatus according to claim 9, further comprising a frame transmission counter, configured to judge whether its count value is more than the threshold of starting transmitting continuous ⅛ rate frames after the base station receives the traffic channel frame prefix from the terminal and determines that the traffic frame currently transmitted is the ⅛ rate frame; if so, the ⅛ rate frame transmitting component is notified to transmit the ⅛ rate frames continuously; and otherwise, the ⅛ rate frame transmitting component is notified to reduce the transmission of the ⅛ rate frame.

* * * * *